F. E. SCHWENTLER.
BRAKE RIGGING FOR TRAILER TRUCKS.
APPLICATION FILED DEC. 24, 1914.
1,197,959.  Patented Sept. 12, 1916.
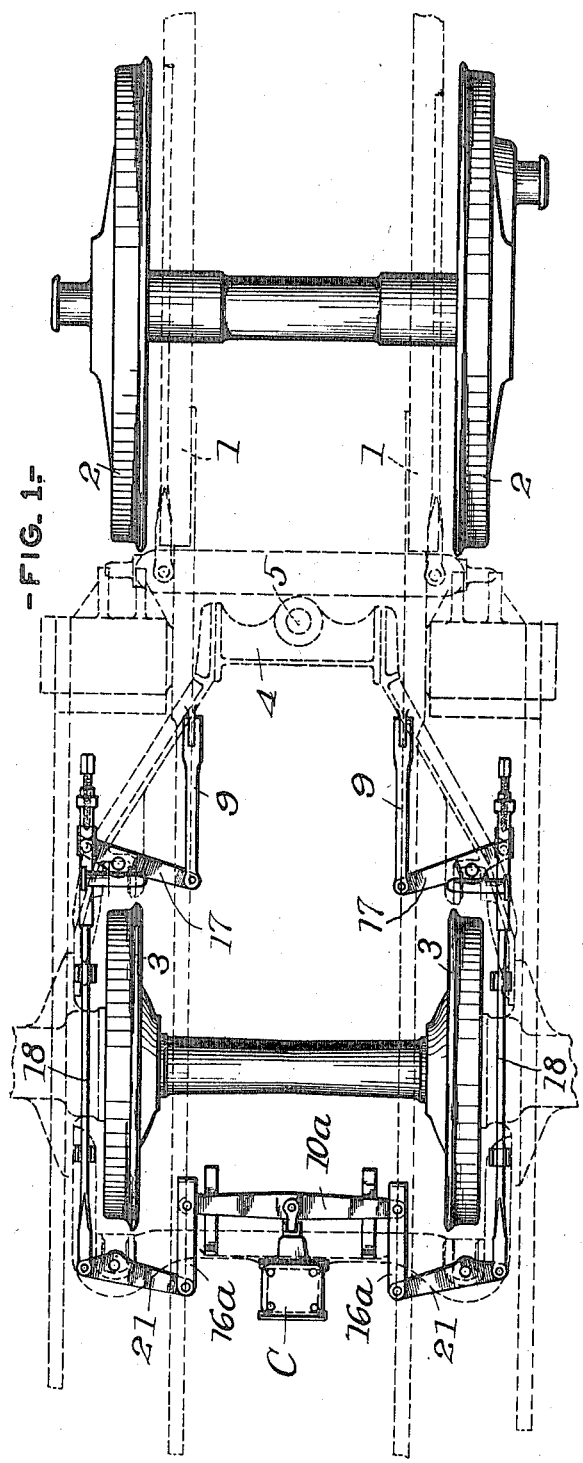
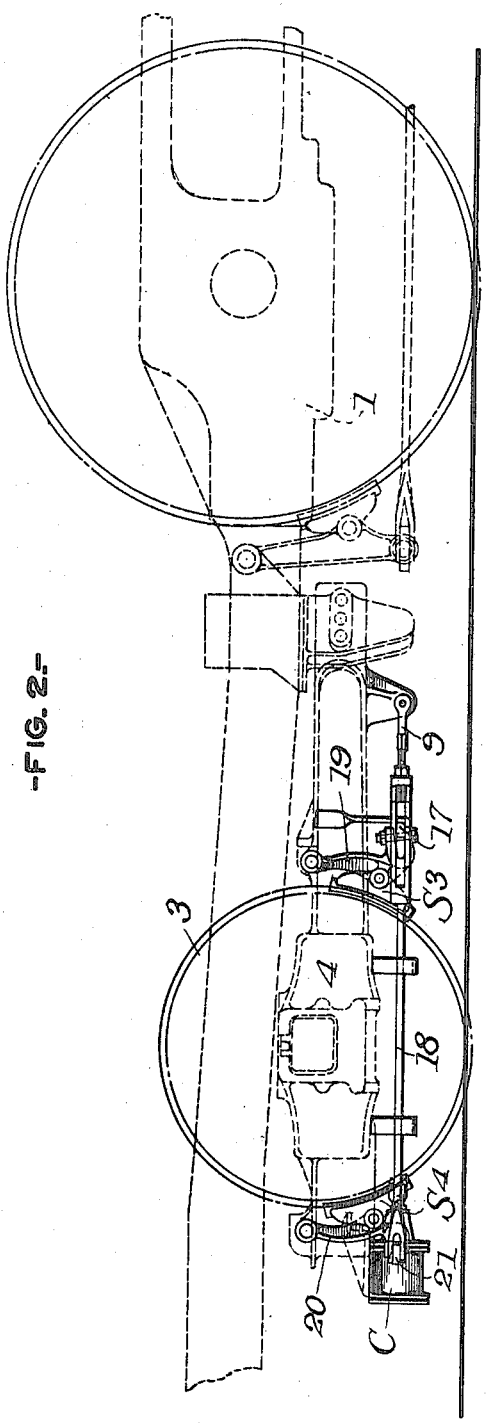

UNITED STATES PATENT OFFICE.

FRANCIS E. SCHWENTLER, OF ST. LOUIS, MISSOURI, ASSIGNOR TO THE AMERICAN BRAKE COMPANY, OF ST. LOUIS, MISSOURI, A CORPORATION OF MISSOURI.

BRAKE-RIGGING FOR TRAILER-TRUCKS.

1,197,959.   Specification of Letters Patent.   Patented Sept. 12, 1916.

Original application filed November 11, 1914, Serial No. 871,437. Divided and this application filed December 24, 1914. Serial No. 878,969.

*To all whom it may concern:*

Be it known that I, FRANCIS E. SCHWENTLER, a citizen of the United States, and a resident of St. Louis, in the State of Missouri, have invented a certain new and useful Improvement in Brake-Rigging for Trailer-Trucks, of which improvement the following is a specification.

This invention relates to brake-rigging for locomotives having radial trailer trucks, and has for its object to provide a self-contained clasp type of brake for the trailer truck wheels, and operated by an independent brake cylinder mounted on the trailer truck, whereby the full equalized pressure for the brakes on the trailer truck may be readily obtained at all times without the use of mechanical connections with the equalized system of driver brakes. The construction is thus very much simplified, and may be readily applied to the various designs of trailer truck locomotives without interfering with the members of the engine frame.

In the accompanying drawings: Figure 1 is a plan of a brake design embodying my improvement as applied to the radial trailer truck of a locomotive, the main and trailer truck frames being indicated in dotted lines; and Fig. 2, a side elevation of the same.

According to the construction shown in the drawings, my improvement is illustrated in connection with the usual form of trailer truck locomotive having a main frame, 1, with driving wheels, 2, a radial trailer truck frame, 4, pivoted at 5 to the main frame and carrying journal boxes for the trailer truck wheels, 3. The usual form of equalized driver brake system may be employed for applying the brakes to the driving wheels.

For actuating the brakes on the trailer truck, brake heads and shoes, S³ and S⁴, are applied to both sides of the trailing wheels, being pivotally supported on the respective jaw hanger levers, 19 and 20, pivoted on suitable brackets carried by the trailer truck frame. The lower ends of the hangers are pivotally connected to the respective short levers, 17 and 21, which are connected together by pull rods, 18, upon both sides of the trailer truck.

The brake cylinder, C, is mounted on the end cross member of the trailer truck frame and actuates the equalizer, 10ª, connected at its opposite ends by means of pull rods, 16ª, with the ends of one pair of the equalizer truck levers, 21, the other pair of truck levers, 17, being attached at their inner ends to fixed fulcrums by means of rods, 9. In this instance the pull rods, 18, are attached to the outer ends of levers, 17 and 21, and are located outside of the trailing wheels.

This construction comprises a self-contained clasp brake arrangement for the trailer truck wheels and operated by an additional brake cylinder separate from the usual brake cylinder of the equalized driver brake rigging, and mounted on the trailer truck frame. In this way all complicated mechanical connections between the brake levers of the driver brake system and those of the trailer truck are dispensed with, and the design may be readily applied to any of the various forms of trailer truck locomotives.

This application is a division of my prior application Serial No. 871,437, filed November 11, 1914.

Having now described my invention, what I claim as new and desire to secure by Letters Patent is:

1. In a brake rigging for locomotives with trailer trucks, the combination with the trailer truck frame, of brake shoes applied to both sides of the trailer truck wheels, two sets of equalizer truck levers and pull rods, one on each side of the truck below the truck frame, for actuating said brake shoes, the pull rods being outside the truck wheels, a cross equalizer having pull rod connections with one pair of truck levers, the other pair of truck levers having fixed fulcrums, and an independent brake cylinder mounted on the trailer truck frame for actuating said cross equalizer.

2. In a brake rigging for locomotives with trailer trucks, the combination with the trailer truck frame, of brake shoes applied to both sides of the trailer truck wheels, two sets of equalizer truck levers and pull rods, one on each side of the truck below the truck frame, for actuating said brake shoes, the pull rods being outside the truck wheels, a cross equalizer connected with the rear pair of truck levers, the forward truck levers having fixed fulcrums and an independent brake cylinder mounted on the end cross member of the trailer truck frame for actuating said cross equalizer.

FRANCIS E. SCHWENTLER.

Witnesses:
F. G. GUILFAYL,
OTTO J. PAPKE.